US 10,890,837 B2

(12) United States Patent
Lee et al.

(10) Patent No.: US 10,890,837 B2
(45) Date of Patent: Jan. 12, 2021

(54) STRUCTURED LIGHT PROJECTION SYSTEM

(71) Applicant: LIGITEK ELECTRONICS CO., LTD., New Taipei (TW)

(72) Inventors: Hsiao-Wen Lee, New Taipei (TW); I-Hsin Tung, New Taipei (TW)

(73) Assignee: LIGITEK ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/384,952

(22) Filed: Apr. 16, 2019

(65) Prior Publication Data

US 2019/0317390 A1    Oct. 17, 2019

(30) Foreign Application Priority Data

Apr. 16, 2018  (TW) .............................. 107113144 A
Mar. 14, 2019  (TW) .............................. 108109014 A

(51) Int. Cl.
*G03B 21/20* (2006.01)
*G02B 27/30* (2006.01)
*G03B 21/14* (2006.01)
*G02B 27/09* (2006.01)

(52) U.S. Cl.
CPC ..... *G03B 21/2033* (2013.01); *G02B 27/0944* (2013.01); *G02B 27/0955* (2013.01); *G02B 27/30* (2013.01); *G03B 21/142* (2013.01)

(58) Field of Classification Search
CPC .............. G03B 21/2033; G03B 21/142; G02B 27/0944; G02B 27/0955; G02B 27/30
See application file for complete search history.

(56) References Cited

U.S. PATENT DOCUMENTS

| 5,257,051 A * | 10/1993 | Bushroe ................. G01B 11/27 353/122 |
| 6,252,252 B1 * | 6/2001 | Kunii .................. H01L 31/0203 257/433 |
| 2013/0038881 A1 * | 2/2013 | Pesach ................... G01B 11/25 356/610 |
| 2016/0363667 A1 * | 12/2016 | Ishikawa ................ G01S 17/32 |
| 2019/0252852 A1 * | 8/2019 | Halbritter ........... H01S 5/02244 |

FOREIGN PATENT DOCUMENTS

| TW | I608252 | 12/2017 |
| TW | I608252 B | * 12/2017 ............. G02B 27/18 |
| WO | WO 0182427 | * 1/2001 ............. H01S 5/022 |

OTHER PUBLICATIONS

Machine Translation of TWI608252B (Year: 2020).*

* cited by examiner

*Primary Examiner* — Jerry L Brooks
(74) *Attorney, Agent, or Firm* — JCIPRNET

(57) ABSTRACT

A structured light projection system including a substrate, a semiconductor laser chip, a first optical module, and a second optical module is provided. The semiconductor laser chip is electrically connected to the substrate. The first optical module is disposed on the substrate. The second optical module is disposed on the first optical module. The deviation rate between optical axes of the optical modules and the semiconductor laser chip and the calibration time thereof are reduced by the first optical module directly packaging the substrate through a primary optics design, so as to increase the yield of the structured light projection.

20 Claims, 5 Drawing Sheets

STRUCTURED LIGHT PROJECTION SYSTEM

CROSS-REFERENCE TO RELATED APPLICATION

This application claims the priority benefits of Taiwan application serial no. 107113144, filed on Apr. 16, 2018, and Taiwan application serial no. 108109014, filed on Mar. 14, 2019. The entirety of each of the above-mentioned patent applications is hereby incorporated by reference herein and made a part of this specification.

BACKGROUND

Technical Field

The disclosure relates to an optical system, and in particular to a structured light projection system.

Description of Related Art

Along with the prosperous development of optical technology, structured light is further applied in many areas such as 3D contour reproduction, distance measurement, anti-counterfeiting recognition and so on. However, in the exiting technology, the generation method of the structured light is mostly composed of a light emitting module, a lens conversion module, a collimating lens, and a diffractive optical element (DOE). As disclosed by, for example, a patent entitled "optical device" with the Taiwan Invention Patent No.: 1608252, a collimating lens, a conversion lens module, and an optical element group are included in a case, and the conversion lens module is composed of a plurality of optical lens with different refractive powers combining and overlapping one another with appropriate intervals. Therefore, five or more optical lenses are in the case. When a plurality of optical lens with different refractive powers combine with one another, optical axes of the optical lenses need to be precisely aligned to avoid the issue of resolution reduction; in addition, each conversion optical lens needs to be arranged and combined in specific intervals, which would consume plenty of production process and precise calibration, making it hard to increase the production and to lower the cost; further, when the plurality of optical lenses in the conversion lens module are stacked, an overall optical effect of the conversion lens module would be affected if the optical axis of one optical lens deviates, and thus affect the yield. Besides, because each lens on the conversion lens module has an independent optical axis, when one optical lens is stacked on another optical lens, the deviation of the optical axis alignment would accumulate due to the increase of the number of lens layers, making the yield lower, and therefore cannot achieve the effect of thinning. In addition, in the existing art, a structured light projector is generally manufactured by a wafer lens packaging (WLP) process, i.e. a packaging process established on a III-V compound semiconductor substrate. However, this process is costly and hard to design, which is easy to cause end products to have stability issues.

SUMMARY

In view of the abovementioned problem, the Inventor of the disclosure performs research and analysis to the optical area and packaging technology, aiming to design an actual product that meets the requirement mentioned above based on the experience of research and development to related products for years; therefore, the disclosure provides a primary optics design to simply the times of optical axis alignment of optical elements, so as to increase precision and yield of a structured light projection system.

One embodiment of the disclosure provides a structured light projection system, including a substrate, at least one semiconductor laser chip, a first optical module and a second optical module, wherein the substrate is made of semiconductor or non-semiconductor material, and has an installation surface. At least one semiconductor laser chip is electrically connected on the installation surface of the substrate and configured to generate at least one beam. Further, the first optical module is disposed on the installation surface by molding, which means that the first optical module adopts a primary optics packaging design method to be directly disposed on the semiconductor laser chip, so that there is no air gap between the first optical module and each of the semiconductor laser chip and the substrate. Moreover, the first optical module is composed of at least one optical lens; further, the second optical module is disposed on the first optical module, and the second optical module includes a case and at least one diffractive optical element. The embodiment of the disclosure simplifies a number of layers of the optical lenses of the second optical module through applying a primary optics design to the first optical module, so as to decrease the deviation rate of the optical axis alignment to increase the yield of the products.

Further, the semiconductor laser chip is configured to generate an infrared light of a wavelength ranging from 750 nm to 1000 nm, and, is preferably configured to generate an infrared light of a wavelength ranging from 790 nm to 830 nm, a wavelength ranging from 830 nm to 870 nm or a wavelength ranging from 900 nm to 1000 nm.

Further, a refractive power of at least one optical lens of the first optical module may be positive or negative, and the at least one optical lens has a light exit surface configured to expand or to converge the beam generated by the semiconductor laser chip to change the path.

Further, the semiconductor laser chip has a first optical axis, and the first optical module has a second optical axis, and the second optical module has a third optical axis. When a combination between the semiconductor laser chip and each optical module is completed, a coaxial alignment is presented among the optical axes.

Further, a deviation value between the first optical axis and the second optical axis is smaller than or equals to 20 μm.

Further, a deviation value between the second optical axis and the third optical axis is smaller than or equals to 50 μm.

Further, a deviation value among the first optical axis, the second optical axis and the third optical axis is smaller or equals to 50 μm.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
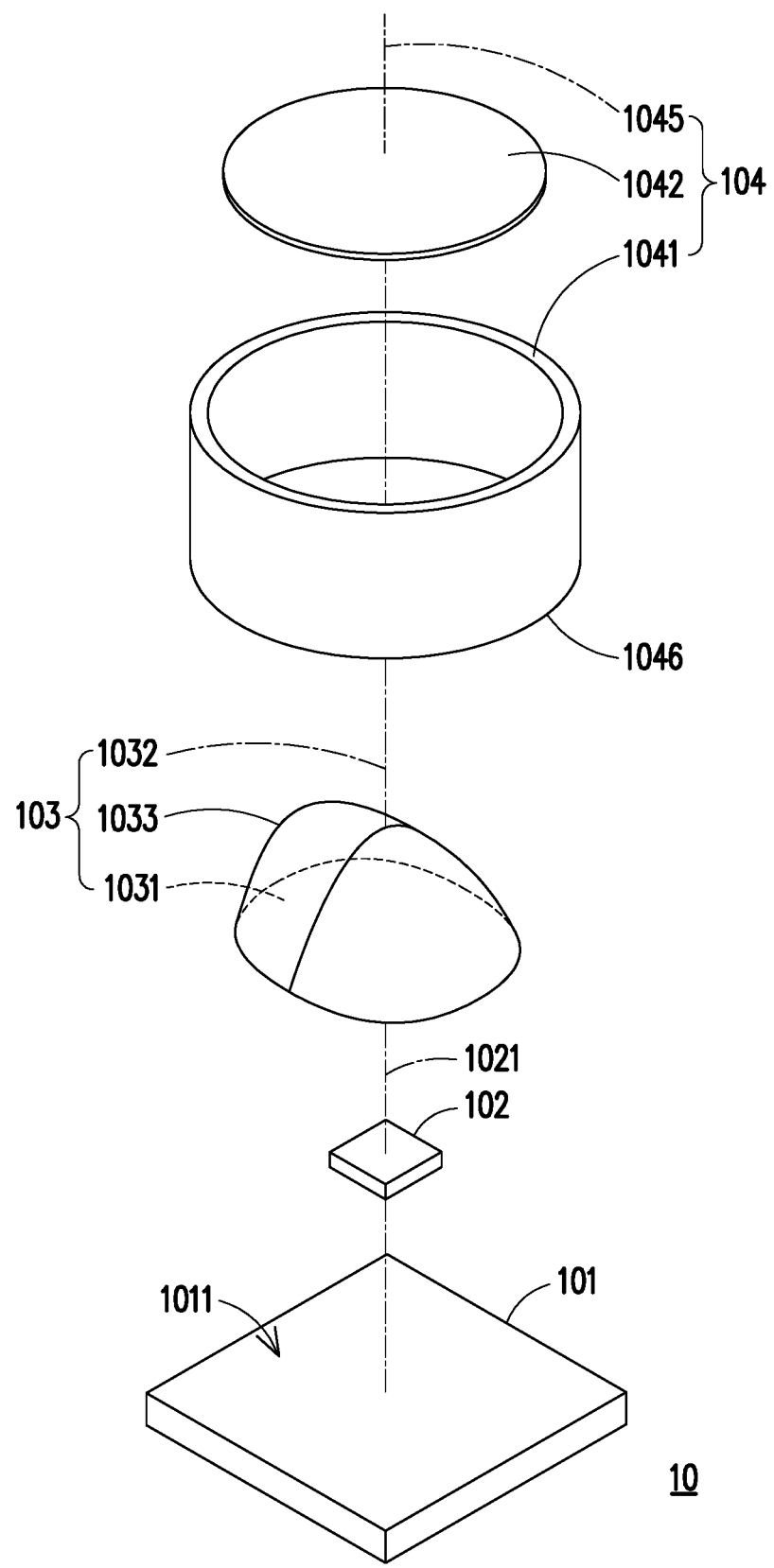
FIG. 1 is an exploded view of a structured light projection system according to an embodiment of the disclosure.
Figure 2:
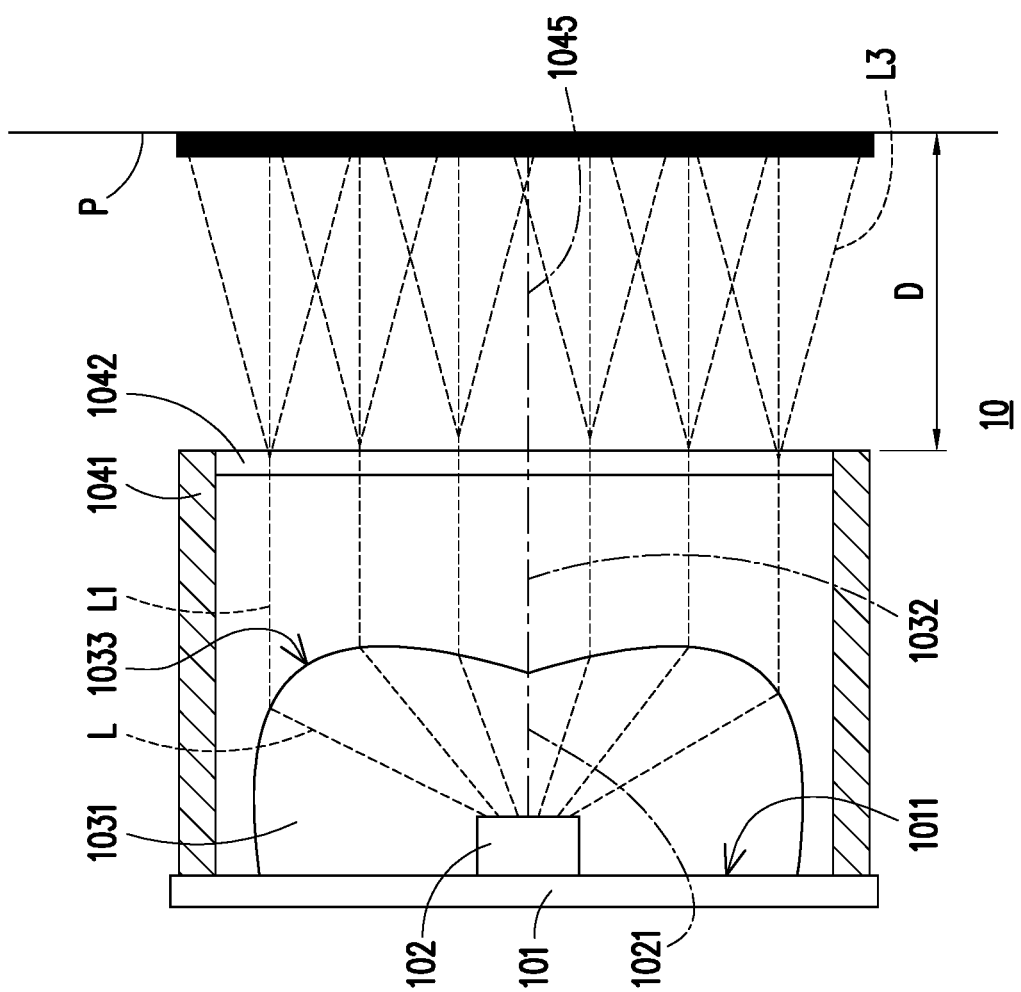
FIG. 2 is a sectional schematic view of the structured light projection system of FIG. 1.

FIG. 1 is an exploded view of a structured light projection system according to an embodiment of the disclosure. FIG. 2 is a sectional schematic view of the structured light projection system of FIG. 1. Please refer to FIG. 1 and FIG. 2. As shown in the figures, a structured light projection system 10 includes a substrate 101, a semiconductor laser chip 102, a first optical module 103 and a second optical module 104, wherein the substrate 101 may be made of a non-semiconductor material or a semiconductor material. The substrate 101 of the non-semiconductor material may be a metal substrate, a ceramic substrate, or a glass fiber substrate (e.g., FR-4, FR-5, G-10, or G-11) and so on, but is not limited hereto. The substrate 101 has an installation surface 1011. The semiconductor laser chip 102 is electrically disposed on the installation surface 1011 of the substrate 101 and has a first optical axis 1021. The semiconductor laser chip 102 is configured to generate a visible or invisible light, and is, for example, a laser diode (LD), a vertical-cavity surface-emitting laser (VCSEL), or an edge emitting laser (EEL), which is, however, not limited hereto. The semiconductor laser chip 102 may generate an infrared invisible light of a wavelength ranging from 700 nm to 1000 nm, or generate a visible light of a wavelength ranging from 380 nm to 780 nm (such as a blue light of a wavelength ranging from 450 nm to 480 nm, a green light of a wavelength ranging from 500 nm to 560 nm, or a red light of a wavelength ranging from 600 nm to 700 nm); further, the first optical module 103 is disposed on the installation surface 1011 by molding. The first optical module 103 has a second optical axis 1032 and includes an optical lens 1031 whose refractive power is positive (or negative), and the optical lens 1031 has a light exit surface 1033. Specifically, the material of the optical lens 1031 is chosen from epoxy resin, acrylic resin, silicone resin, or silicone, and the refractive index thereof ranges from 1.4 to 1.6, and preferably ranges from 1.4 to 1.43 or ranges from 1.5 to 1.53, but is not limited thereto. The design of the light exit surface 1033 may be any one of a spherical surface, an aspheric surface, an arc surface, a paraboloid, a hyperboloid, and a free-form surface. Further, the equation of the aspheric surface is, for example, as below:

$$z = \frac{cr^2}{1+\sqrt{1-(1+k)c^2r^2}} + \sum_{i=1}^{n} a_i r^i$$

wherein, r is the distance between a point on an aspheric surface and the optical axis; z is an aspheric depth, which is the perpendicular distance between a point at a distance r from the optical axis on the aspheric surface and a tangential plane tangent to a vertex on the aspheric optical axis; c is a reciprocal of the radius of a osculating sphere, which is a radius of curvature close to the optical axis; k is a conic constant; $a_i$ is an $i^{th}$ order aspheric coefficient. c=1/R, wherein R is a radius of curvature close to the optical axis. In an embodiment, k<0 and 1.5 mm≤R≤5 mm.

The optical lens 1031 directly packages and covers the semiconductor laser chip 102, and is tightly attached to the semiconductor laser chip 102, so that there is no air gap between the optical lens 1031 and each of the installation surface 1011 of the substrate 101 and the semiconductor laser chip 102. The molding method is to inject a material of the optical lens 1031 into a cavity of a mold, then insert the semiconductor laser chip 102 already fixed on the installation surface 1011, and then, heat directly to make the material of the optical lens 1031 cured, then take out the shaped material out of the cavity of the mold; or, to dispose the semiconductor laser chip 102 in the mold after fixing the semiconductor laser chip 102 on the installation surface 1011, then clamp two upper and lower molds with a hydraulic press and vacuum the cavity of the molds, and then, put the material of the optical lens 1031 into the gate of a molding channel, and force a pressure to make the material enter each molding cavity along the channel and heat to cure the material, and then take out the shaped material out of the cavity of the mold. Through the method mentioned above, the optical lens 1031 may be integrally formed on the semiconductor laser chip 102; further, through the light exit surface 1033, the path of the beam generated by the semiconductor laser chip 102 may be adjusted directly; meanwhile, through the abovementioned method, the first optical axis 1021 and the second optical axis 1032 may be made to present a coaxial alignment during a manufacturing process, so as to simplify a calibration time to achieve an effect of mass production; and in a preferable embodiment, a deviation value between the first optical axis 1021 and the second optical axis 1032 does not exceed 20 μm. In an embodiment, a deviation value between the first optical axis 1021 and the second optical axis 1032 does not exceed 10 μm. Moreover, the second optical module 104 is disposed on the first optical module 103, and the second optical module 104 includes a case 1041 and a diffraction optical element (DOE) 1042, having a third optical axis 1045, wherein the case 1041 has a hollow room, and an opening on each of its both ends to make the inner space communicate with each other. One end of the case 1041 is formed to have a connection portion 1046, which may be disposed on the installation surface 1011 through an adhesive or a method of mechanical composition (such as buckling or plugging). When the connection portion 1046 is disposed on the installation surface 1011 through the method of adhesive, the adhesive may be cured (such as light-curing or thermal curing) after the third optical axis 1045 is confirmed to be aligned with the second optical axis 1032, so as to increase a concentricity among the optical axes. Further, the diffractive optical element 1042 is disposed on the other end of the case 1041 opposite to the connection portion 1046; and in a preferable embodiment, the diffractive optical element 1042 may be aligned with the opening. As shown by the figures, the diffractive optical element 1042 is configured to make an input beam split and duplicate into a plurality of output beams, which means a phase and an amplitude of an incident light is changed, making an energy wave front of the incident light redistribute, so as to generate a grating pattern to be projected on a projection surface P, and when the second optical module 104 is disposed on the first optical module 103, the first optical module 103 is accommodated in the case 1041 of the second optical module 104; therefore, only making the second optical axis 1032 and the third optical axis 1045 present the coaxial alignment is needed, whereby the situation of needing to adjust a plurality of optical lenses, needing large calibration and alignment time, and causing a large error rate is reduced, so that the yield may be increased. Specifically, a deviation value between the second optical axis 1032 and the third optical axis 1045 does not exceed 50 μm. In the present embodiment, a light beam transmitted along and emitted from the first optical axis 1021 continues to be transmitted along the second optical axis 1032 and the third optical axis 1045 in sequence. In an embodiment, a deviation value between the second optical axis 1032 and the third optical axis 1045 does not exceed 20 μm. Besides, a deviation value among the first optical axis 1021, the second optical axis 1032 and the third optical axis 1045 is less than or equals to 50 μm.

Please refer to FIG. 2 again. Firstly, the semiconductor laser chip 102 may generate at least one beam L. The first optical module 103 is disposed on a transmission path of the at least one beam L, making the beam L converged or expanded to be an output beam L1 (the beam L is converged or expanded to be the output beam L1 through the primary optics design of the light exit surface 1033), and the output beam L1 is projected on the projection surface P outside the case 1041 through the second optical module 104, and a certain distance D is between the projection surface P and the structured light projection system 10. Specifically, the distance D ranges from 300 cm to 500 cm, making the output beam L1 diffracted to the projection surface P to form a plurality of diffractive light spots after being incident to the diffractive optical element 1042. In other words, the diffractive optical element 1042 is disposed on the transmission path of the output beam L1, and converts the output beam L1 into a structured light L3 that forms a plurality of diffractive light spots on the projection surface P after being projected on the projection surface P.

In the present embodiment, the light exit surface 1033 is a smooth refractive curved surface that may effectively converge the beam L (when the light exit surface 1033 is convex) or diverge the beam L (when the light exit surface 1033 is concave). In addition, when the substrate 101 adopts a substrate of non-semiconductor material, a wafer level optics manufacturing process with higher costs may not be adopted to manufacture the first optical module 103 and the second optical module 104. Therefore, the manufacturing cost of the structured light projection system 10 may be reduced effectively. Besides, compared to the wafer level optics manufacturing process, the light exit surface 1033 of the optical lens 1031 manufactured by the molding manufacturing process used by the present embodiment may be more precise, and the design degree of freedom is higher (which means that the light exit surface 1033 may be designed as spherical, aspheric or free-formed surface); thus, the optical quality of the structured light projection system 10 is effectively increased.

Figure 3:
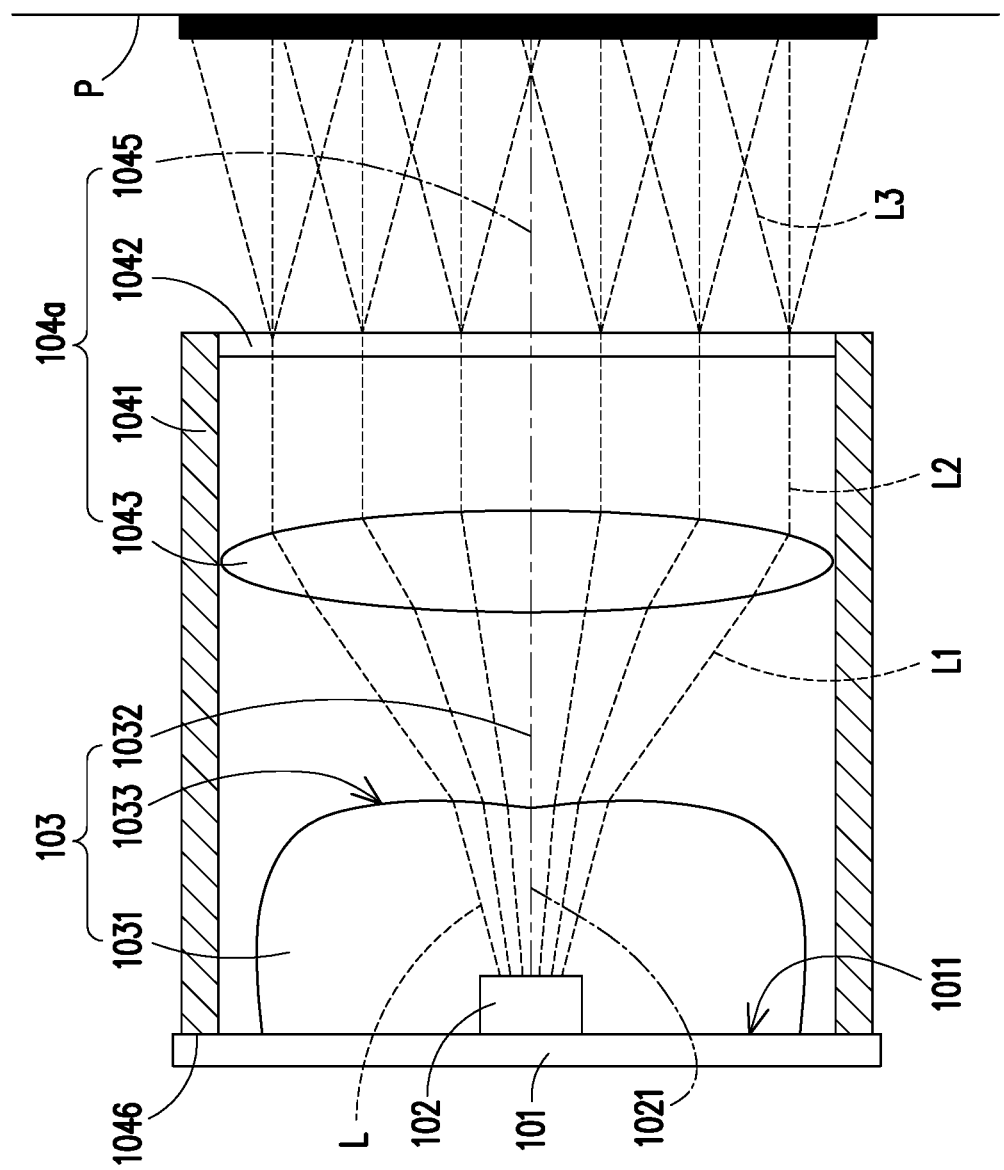
FIG. 3 is a sectional schematic view of a structured light projection system according to another embodiment of the disclosure.

FIG. 3 is a sectional schematic view of a structured light projection system according to another embodiment of the disclosure. Please refer to FIG. 3. In the present embodiment, a semiconductor laser chip 102 is disposed on a substrate 101 of non-semiconductor material, and the semiconductor laser chip is a vertical-cavity surface-emitting laser chip, having m light emitting spots (m is a positive integer that is more than 1), and 200≤m≤600; further, the first optical module 103 is disposed on the substrate 101, and the optical lens 1031 directly packages and covers the semiconductor laser chip 102, and the light exit surface 1033 of the optical lens 1031 is a free-form surface. However, in other embodiments, the light exit surface 1033 may also be aspheric or spherical. Further, the second optical module 104a includes a case 1041, at least one optical element 1043 and a diffractive optical element 1042, wherein the case 1041 has a hollow room, and the height of the case 1041 is less than 5 mm or less than 3 mm. Each of both ends of the case 1041 has an opening, wherein one end of the case 1041 is formed to have a connection portion 1046 disposed on the substrate 101, and the first optical module 103 is accommodated in the case 1041; further, the diffractive optical element 1042 is disposed on the other end of the case 1041 opposite to the connection portion 1046, and the optical element 1043 is disposed between the optical lens 1031 and the diffractive optical element 1042. An appropriate distance are among the optical element 1043, the optical lens 1031 and the diffractive optical element 1042, and the appropriate distance does not exceed 3 mm or does not exceed 1 mm; further, the optical element 1043 may be an optical lens with a positive (or negative) refractive power. A material of the lens may be plastic or glass, wherein the plastic material may be made from materials such as resin or polymer and so on, specifically by materials including polycarbonate, poly (methyl methacrylate), cyclo olefin copolymer or polyester resin and so on, but is not limited hereto. When the material of the optical lens is plastic, the manufacturing costs and weight mat be effectively reduced; on the other hand, when the material of the optical lens is glass, the degree of freedom and design space of refractive power disposal of the second optical module 104a may be increased; further, the number of the optical lens(es) ranges from 1 to 3, wherein each of the lens(es) has a thickness less than 5 mm or less than 3 mm, and may have a thickness ranging from 1 mm to 5 mm or 1 mm to 3 mm. Moreover, an order of the diffractive optical element ranges from 5×5 to 13×13 order, and the order here is the number of duplication of the diffractive light spots; therefore, when the semiconductor laser chip 102 generates a beam L, an output beam L1 is first emitted through the light exit surface 1033, and at least one collimated beam L2 is output after the output beam L1 is refracted by the optical lens (which is the optical element 1043), and after the collimated beam L2 is incident toward the diffractive optical element 1042, a diffractive grating pattern of a plurality of diffractive light spots is presented on the projection surface P after the collimated beam L2 is diffracted by the diffractive optical element 1042; preferably, the number of the diffractive light spots may be 10000, 15000, 20000, 30000 or ranges from 10000 to 40000.

Figure 4:
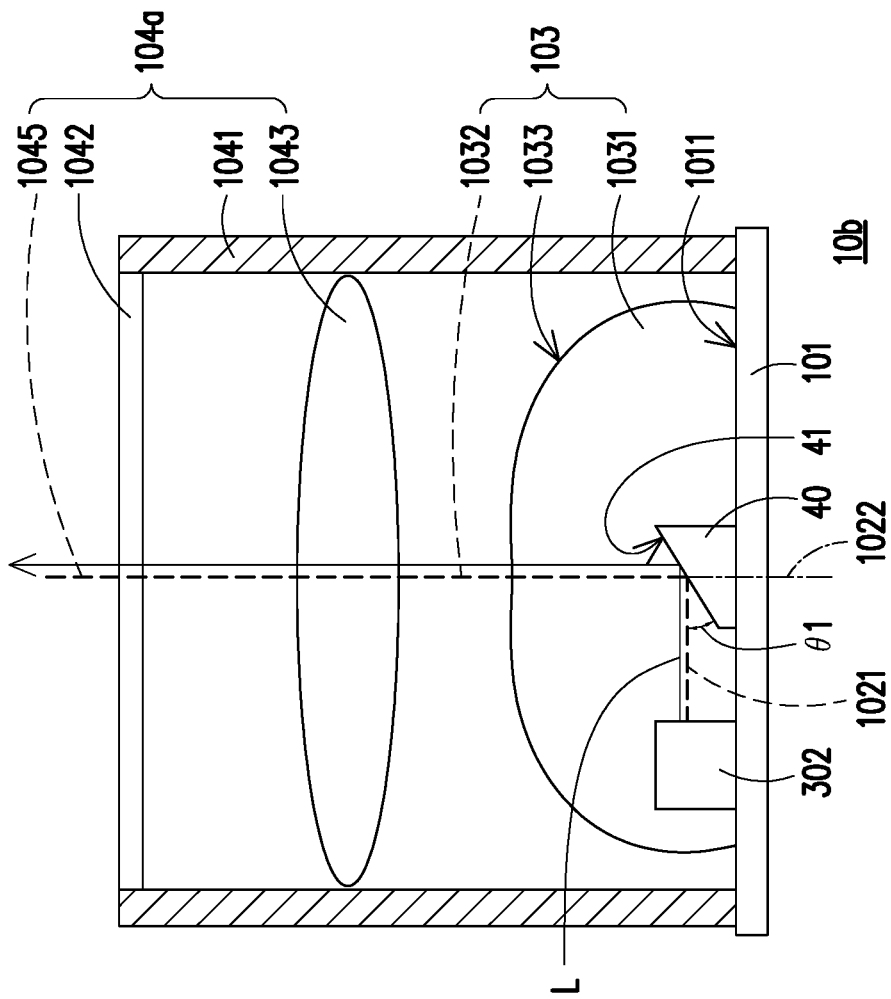
FIG. 4 is a sectional schematic view of the structured light projection system according to still another embodiment of the disclosure.
Figure 5:
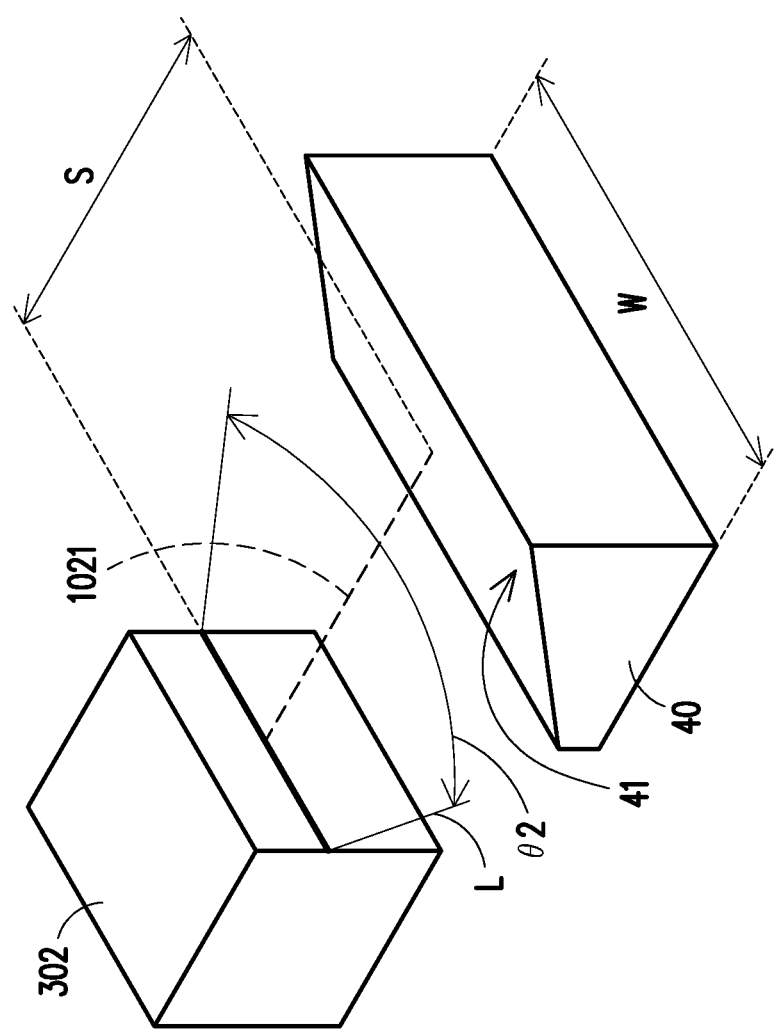
FIG. 5 is a perspective schematic view of the semiconductor laser chip and reflector in the structured light projection system of FIG. 4.

FIG. 4 is a sectional schematic view of the structured light projection system according to still another embodiment of the disclosure. FIG. 5 is a perspective schematic view of the semiconductor laser chip and reflector in the structured light projection system of FIG. 4. Please refer to FIG. 4 and FIG. 5. As shown in the figures, a structured light projection system 10b includes a substrate 101, a semiconductor laser chip 302, a first optical module 103 and a second optical module 104a, wherein the semiconductor laser chip 302 is an edge emitting laser chip and has a first optical axis 1021 as shown in FIG. 4 and FIG. 5. The difference between the present embodiment and the abovementioned embodiment lies in that the structured light projection system 10b further includes a reflector 40 disposed or integrally formed on the substrate 101, and the reflector 40 has a reflective surface 41, and an interval is formed between the reflective surface 41 from a light emitting end of the semiconductor laser chip 302, making the beam L emitted from the semiconductor laser chip 302 be reflected toward the light exit surface 1033 by the reflective surface 41, and making the beam L travel away from the installation surface 1011. In an embodiment, the relationship between the semiconductor laser chip 302 and the reflective surface 41 satisfies $0.17 \leq W/S \leq 0.73$, wherein W is a length of a long side of the reflective surface 41, and S is a distance from the semiconductor laser chip 302 to the reflective surface 41 on the first optical axis 1021; wherein, it is assumed that, a divergence angle of the semiconductor laser chip 302 on a horizontal direction is θ2, then the θ2 roughly ranges from 10 degrees to 40 degrees. Therefore, when a relationship between the semiconductor laser chip 302 and the reflective surface 41 satisfies 0.17≤W/S≤0.73, the beam L emitted from the semiconductor laser chip 302 may irradiate at least a major part on the reflective surface 41. In the present embodiment, the beam L emitted from the semiconductor laser chip 302 may be reflected upward perpendicular to the substrate 101 by the reflective surface 41, making the beam L emitted from the light exit surface 1033, wherein the reflective surface 41 and the first optical axis 1021 of the semiconductor laser chip 302 form an included angle θ1 ranging from 30 degrees to 60 degrees, and preferably, the included angle may be 45 degrees; therefore, the present embodiment changes the light emitting direction of the beam L of the semiconductor laser chip 302 through a reflector 40, so as to decrease a height of the first optical module 103 to achieve an improved effect of thinning. In the present embodiment, the height of the first optical module 103 ranges from 1 mm to 2 mm, and the total height of the overall structured light projection system of the present embodiment is lower than 5 mm.

In the present embodiment, the optical lens 1031 is disposed on the installation surface 1011 by molding, and covers and packages the semiconductor laser chip 302 and the reflector 40. In other words, there is no air gap between the optical lens 1031 and the semiconductor laser chip 302 as well as between the optical lens 1031 and the reflector 40. Thus, a coaxial alignment may be presented between a mirror image 1022 of the first optical axis 1021 with respect to the reflective surface 41 and the second optical axis 1032 easily during a molding process. In the present embodiment, a coaxial alignment is presented between the mirror image 1022 of the first optical axis 1021 with respect to the reflective surface 41 and the second optical axis 1032, and the deviation value thereof is less than or equals to 20 μm. The mirror image 1022 and the first optical axis 1021 are mirror symmetrical to each other using the reflective surface 41 as a symmetrical plane. Besides, in the present embodiment, a coaxial alignment is presented among the mirror image 1022 of the first optical axis 1021 with respect to the reflective surface 41, the second optical axis 1032 and the third optical axis 1045, and the deviation value thereof is less than or equals to 50 μm.

From the description mentioned above, it can be known that the structured light projection system of the embodiments of the disclosure includes a substrate, a semiconductor laser chip, a first optical module and a second optical module, wherein the semiconductor laser chip has a first optical axis, the first optical module has a second optical axis, and the second optical module has a third optical axis. After the semiconductor laser chip is electrically disposed on the substrate, the first optical module directly packages the semiconductor laser chip by molding, so that there is no air gap between the first optical module and each of the substrate and the semiconductor laser chip (which is the primary optics design), and making the first optical axis and the second optical axis present the coaxial alignment; further, the second optical module is disposed on the first optical module, and the third optical axis and the second optical axis coincide to present the coaxial alignemnt, so as to achieve an expected optical effect; therefore, after the disclosure is implemented, a structured light projection system that simplifies optical axis alignment times through the primary optics design to increase precision and yield may indeed be achieved.

It will be apparent to those skilled in the art that various modifications and variations can be made to the structure of the disclosure without departing from the scope or spirit of the disclosure. In view of the foregoing, it is intended that the disclosure covers modifications and variations of this disclosure provided they fall within the scope of the following claims and their equivalents.

What is claimed is:

1. A structured light projection system comprising:
   a substrate of non-semiconductor material having an installation surface, wherein the substrate of non-semiconductor material is a ceramic substrate or a glass fiber substrate;
   a semiconductor laser chip, configured to generate at least one beam, and disposed on the installation surface and having a first optical axis;
   a first optical module, disposed on a transmission path of the at least one beam, and having a second optical axis and comprising an optical lens having a light exit surface, wherein there is no air gap between the optical lens and the semiconductor laser chip, and the light exit surface is a smooth refractive curved surface; and
   a second optical module, disposed on the first optical module and having a third optical axis, wherein the second optical module comprises a hollow case and at least one diffractive optical element disposed on the transmission path of the at least one beam and converting the at least one beam into a structured light,
   wherein the first optical module is accommodated in the hollow case, a light beam transmitted along and emitted from the first optical axis is then transmitted along the second optical axis and the third optical axis in sequence, the semiconductor laser chip is a vertical-cavity surface-emitting laser chip, and a light-emitting surface of the semiconductor laser chip faces the diffractive optical element and is in direct contact with the optical lens.

2. The structured light projection system according to claim 1, wherein the optical lens is disposed on the installation surface by molding, and covers and packages the semiconductor laser chip.

3. The structured light projection system according to claim 2, wherein one end of the hollow case is formed to have a connection portion disposed on the installation surface, and the diffractive optical element is disposed on another end of the hollow case opposite to the connection portion.

4. The structured light projection system according to claim 3, wherein the second optical module further comprises at least one optical element disposed between the first optical module and the diffractive optical element.

5. The structured light projection system according to claim 4, wherein the light exit surface of the optical lens is configured to transmit the beam into the optical element, and at least one collimated beam is generated after the beam is refracted by the optical element and is incident into the diffractive optical element; the collimated beam presents a plurality of diffractive light spots on a projection surface after being diffracted by the diffractive optical element.

6. The structured light projection system according to claim 4, wherein a thickness of the hollow case is less than 3 mm.

7. The structured light projection system according to claim 5, wherein a distance between the diffractive optical element and the projection surface ranges from 300 cm to 500 cm.

8. The structured light projection system according to claim 1, wherein the vertical-cavity surface-emitting laser chip has 200 to 600 light emitting spots.

9. The structured light projection system according to claim 8, wherein an order of the diffractive optical element ranges from 5×5 to 13×13 order, and the order is the number of duplication of diffractive light spots.

10. The structured light projection system according to claim 9, wherein the number of the plurality of diffractive light spots ranges from 10000 to 40000.

11. The structured light projection system according to claim 2, wherein a coaxial alignment is presented among the first optical axis, the second optical axis and the third optical axis, and a deviation value thereof is smaller than or equals to 50 μm.

12. The structured light projection system according to claim 2, wherein a coaxial alignment is presented between the first optical axis and the second optical axis, and a deviation value thereof is smaller than or equals to 20 μm.

13. A structured light projection system comprising:
a substrate of non-semiconductor material having an installation surface;
a semiconductor laser chip, configured to generate at least one beam, and disposed on the installation surface and having a first optical axis;
a first optical module, disposed on a transmission path of the at least one beam, and having a second optical axis and comprising an optical lens having a light exit surface, wherein there is no air gap between the optical lens and the semiconductor laser chip; and
a second optical module, disposed on the first optical module and having a third optical axis, wherein the second optical module comprises a hollow case and at least one diffractive optical element disposed on the transmission path of the at least one beam and converting the at least one beam into a structured light,
wherein the first optical module is accommodated in the hollow case, a light beam transmitted along and emitted from the first optical axis is then transmitted along the second optical axis and the third optical axis in sequence, the semiconductor laser chip is an edge emitting laser chip, and the structured light projection system further comprises a reflector disposed on the installation surface; the reflector is a solid body and has a reflective surface configured to reflect the beam emitted from the edge emitting laser chip to the light exit surface and make the beam travel away from the installation surface; there is no air gap between the optical lens and each of the substrate, the edge emitting laser chip, and the reflector; the reflector connects a part of the optical lens with the substrate.

14. The structured light projection system according to claim 13, wherein a coaxial alignment is presented among a minor image of the first optical axis with respect to the reflective surface, the second optical axis and the third optical axis, and a deviation value thereof is smaller than or equals to 50 μm.

15. The structured light projection system according to claim 13, wherein a coaxial alignment is presented between a minor image of the first optical axis with respect to the reflective surface and the second optical axis, and a deviation value thereof is smaller than or equals to 20 μm.

16. The structured light projection system according to claim 13, wherein the optical lens is disposed on the installation surface by molding, and covers and packages the edge emitting laser chip and the reflector.

17. The structured light projection system according to claim 16, wherein the reflective surface and the first optical axis form an included angle which ranges from 30 degrees to 60 degrees.

18. The structured light projection system according to claim 17, wherein the thickness of the hollow case is smaller than 5 mm.

19. The structured light projection system according to claim 1, wherein the light exit surface is a free-form surface.

20. The structured light projection system according to claim 1, wherein the light exit surface is an aspheric surface satisfying $k<0$ and $1.5 \text{ mm} \leq R \leq 5 \text{ mm}$, where $k$ is a conic constant of the light exit surface, and $R$ is a radius of curvature of the light exit surface close to the second optical axis.

* * * * *